UNITED STATES PATENT OFFICE.

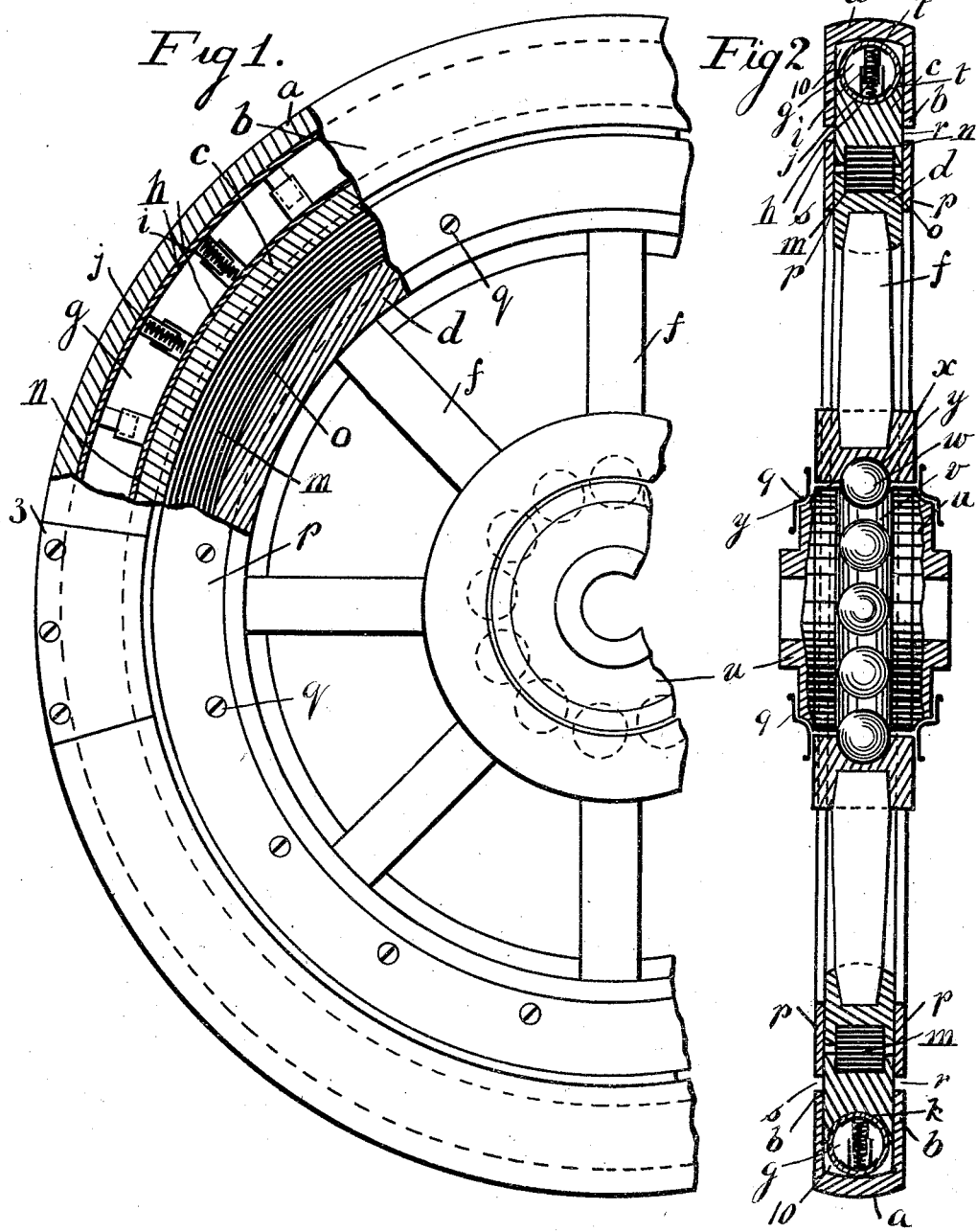

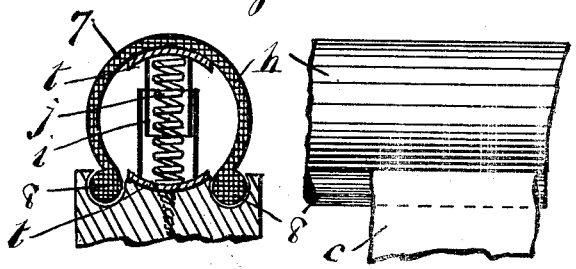
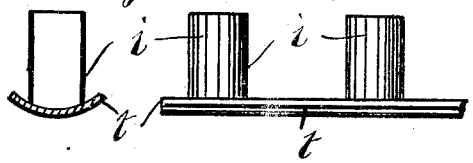
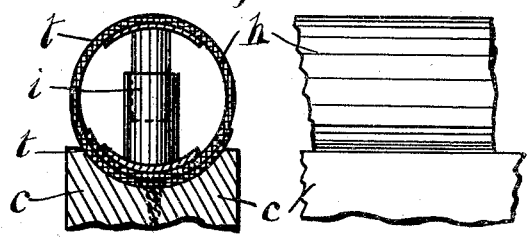
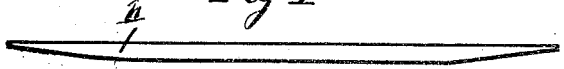

JOSEPH DAVIES, OF BIRMINGHAM, ENGLAND.

WHEEL FOR ROAD-VEHICLES.

No. 865,765.    Specification of Letters Patent.    Patented Sept. 10, 1907.

Application filed August 25, 1906. Serial No. 332,059.

*To all whom it may concern:*

Be it known that I, JOSEPH DAVIES, a citizen of Great Britain, residing at Birmingham, in the county of Warwick, England, a subject of King Edward VII, have invented certain new and useful Improvements in and Relating to the Construction of Wheels for Road and other Vehicles; and I do hereby declare the following to be a full, clear, and exact description of the invention, such as will enable others skilled in the art to which it appertains to make and use the same.

The object of this invention is to provide a wheel for road and other vehicles, whereby vibration and skidding are considerably minimized, and ample resilience is obtained without any danger occurring from punctures.

My invention consists essentially in the construction and arrangements of the parts of a wheel in which an iron or steel tire or tread is used, the tire being so arranged as to be supported or held on a flexible or resilient seating.

I provide an auxiliary tire which is arranegd to carry the flexible seating aforesaid, and is supported on a wood felly, by a rubber or other flexible cushion interposed between them. I likewise provide a primary hub which is keyed to the axle, the wheel being arranged to rotate around this primary hub, on a series of steel or metal balls.

My invention will be more clearly understood by reference to the accompanying drawings in which the same letters of reference indicate similar parts throughout.

Figure 1 shows a side elevation in part section of part of the circumference of a wheel made in accordance with my invention. Fig. 2 is a vertical section of the same wheel. Figs. 3, 4, and 5, are detail parts of my invention. Fig. 6 is a modification of my invention.

$a$ designates the iron or steel tire or tread having flanges $b$, $b$.

$c$ is an auxiliary tire made preferably of wood, and $d$ is the wood felly of the wheel which carries the spokes $f$. The flexible seating $g$ shown in an enlarged view in Fig. 3 is composed of a rubber band $h$ (Fig. 4) which is bent into a circular form, to this band $h$ are attached two arc shaped strips of steel or other suitable metal $t$, $t$, (Fig. 5.) These strips carrry a series of telescopic tubes $i$, into each of which is placed a coiled spring $j$ the function of which is to keep the circular band expanded. Access to the springs within said resilient tube or band is effected by drawing out the side piece 3. We preferably attach this said flexible seating to the semi-circular part $k$ of the auxiliary tire $c$, the apex of the circumference of the flexible seating $g$ takes bearing against the inner periphery of the tire $a$ at 10.

The flexible cushion $m$ which interposes between the auxiliary tire $c$ and the felly $d$ is composed of a band or bands or plies of rubber or other flexible material which are wound round within the grooves $n$ and $o$.

The parts are held or retained in their respective positions by means of the rings $p$, $p$, which circumvent the entire wheel and which we preferably attach to the felly $d$ by means of screw or other suitable pins $q$; the spaces $r$ and $s$ provide for expansion and contraction of the parts during rotation of the wheel, the resilient or elastic nature of the parts $g$ and $m$ stopping off all tremulous or vibratory motion. The ring $p$ aforesaid and the flange $b$, $b$, of the tire form slides along which the auxiliary tire $c$ may slide during the rotation of the wheel.

The primary hub $u$ is keyed to the axle and provided with a groove $v$ in its periphery in which the steel or metal balls $w$ are free to rotate. This said groove is a little greater in depth than the radius of the balls.

The ring $x$, is provided with a groove $y$, on its inner periphery, and in this said groove the remaining part of the balls $w$ rotate, the hub $u$ and the ring $x$ are retained in juxtaposition by the balls.

Fig. 6 shows a modification of the flexible seating $g$, in which the rubber casing 7 engages with the auxiliary tire $c$ at 8, 8. Fig. 5, shows an enlarged view of the telescopic tubes $i$ attached to the arc shaped strips $t$, $t$. I arrange a dust proof covering 9, composed of rubber canvas or other suitable material for excluding the dust from the various parts of the wheel.

I claim:

1. In a vehicle wheel, an outer metal tire or tread, a resilient tubular seating on which said tire is mounted, an auxiliary tire carrying said seating and an elastic cushion interposed between said auxiliary tire and the felly substantially as set forth.

2. In a vehicle wheel, a flanged metal tread or tire, a flexible tube within said flanges, pairs of radially disposed telescoping tubes mounted on metal strips within said tube and spiral springs contained by said telescoping pairs of tubes, in combination with an auxiliary tire upon which the said resilient tube is mounted, a felly, a resilient band interposed between said auxiliary tire and said felly and a hub about which said felly is free to rotate, substantially as and for the purpose set forth.

In testimony whereof, I have signed my name to this specification in the presence of two subscribing witnesses.

JOSEPH DAVIES.

Witnesses:
 FRANCES E. BARACLOUGH,
 WILLIAM HENRY BARACLOUGH.